(12) United States Patent
Knowlton et al.

(10) Patent No.: US 8,392,220 B2
(45) Date of Patent: Mar. 5, 2013

(54) MEDICATION MANAGEMENT SYSTEM AND METHOD

(75) Inventors: Calvin H. Knowlton, Moorestown, NJ (US); Orsula V. Knowlton, Moorestown, NJ (US); Thomas N. Wilson, Mount Pleasant, SC (US)

(73) Assignee: Carekinesis, Inc., Moorestown, NJ (US)

( * ) Notice: Subject to any disclaimer, the term of this patent is extended or adjusted under 35 U.S.C. 154(b) by 0 days.

(21) Appl. No.: 13/291,223

(22) Filed: Nov. 8, 2011

(65) Prior Publication Data
US 2012/0116810 A1     May 10, 2012

Related U.S. Application Data

(60) Provisional application No. 61/411,496, filed on Nov. 9, 2010.

(51) Int. Cl.
*G06Q 10/00* (2006.01)
(52) U.S. Cl. .............................. 705/3; 705/2
(58) Field of Classification Search ............ 705/2–4
See application file for complete search history.

(56) References Cited

U.S. PATENT DOCUMENTS

| | | | |
|---|---|---|---|
| 4,972,657 A | 11/1990 | McKee | |
| 6,464,506 B1 | 10/2002 | Welles | |
| 7,213,009 B2 | 5/2007 | Pestotnik | |
| 7,454,880 B1 | 11/2008 | Austin | |
| 7,490,048 B2 | 2/2009 | Joao | |
| 7,641,916 B2 | 1/2010 | Chalmers | |
| 7,712,288 B2 | 5/2010 | Ramasubramanian | |
| 7,828,147 B2 | 11/2010 | Caracciolo | |
| 7,925,519 B2 * | 4/2011 | Greene | 705/2 |
| 7,957,983 B2 | 6/2011 | Hoffman | |
| 8,019,471 B2 | 9/2011 | Bogash | |
| 2002/0072933 A1 | 6/2002 | Vonk | |
| 2002/0164598 A1 | 11/2002 | Muhlestein | |
| 2003/0036683 A1 * | 2/2003 | Kehr et al. | 600/300 |
| 2003/0108938 A1 * | 6/2003 | Pickar et al. | 435/6 |
| 2003/0168376 A1 | 9/2003 | Taneja | |
| 2003/0204415 A1 | 10/2003 | Knowlton | |
| 2004/0143171 A1 | 7/2004 | Kalies | |
| 2004/0148054 A1 | 7/2004 | Schwartz | |

(Continued)

FOREIGN PATENT DOCUMENTS

WO    WO0171641   *   9/2001

OTHER PUBLICATIONS

Webster, C. S. (2005). Implementation and assessment of a new integrated drug administration system (IDAS) as an example of a safety intervention in a complex socio-technological workplace. The University of Auckland (New Zealand)). ProQuest Dissertations and Theses, 184-184 p. /search.proquest.com/docview/305391842?accountid=14753. (305391842).*

(Continued)

*Primary Examiner* — Gerald J. O'Connor
*Assistant Examiner* — Mark Holcomb
(74) *Attorney, Agent, or Firm* — Jason F. Cotter; John F. Letchford; Archer & Greiner, P.C.

(57) ABSTRACT

A system and method of facilitating a patient's care transitions both into and upon subsequent discharge from an in-patient medical facility utilizes three points of health care provider intervention. The system and method utilizes a cloud-based medication management system applying rules to determine whether the patient's medications, clinical lab results, genomic information, or other relevant considerations would, in combination, amount to an adverse health outcome. If an adverse health outcome is predicted based on an application of the pre-programmed rules, health care intervention is sought.

7 Claims, 2 Drawing Sheets

U.S. PATENT DOCUMENTS

| | | |
|---|---|---|
| 2005/0123919 A1 | 6/2005 | Stropp |
| 2005/0187789 A1 | 8/2005 | Hatlestad |
| 2006/0184473 A1* | 8/2006 | Eder .............................. 706/20 |
| 2006/0235727 A1* | 10/2006 | Singer et al. ....................... 705/2 |
| 2007/0173971 A1 | 7/2007 | Richardson |
| 2007/0179806 A1 | 8/2007 | Knowlton |
| 2007/0185615 A1 | 8/2007 | Bossi |
| 2007/0187281 A1 | 8/2007 | Neafus, Jr. |
| 2008/0015893 A1 | 1/2008 | Miller |
| 2008/0015894 A1 | 1/2008 | Miller |
| 2008/0054007 A1 | 3/2008 | Mador |
| 2008/0097784 A1 | 4/2008 | Miller |
| 2008/0126117 A1 | 5/2008 | Miller |
| 2008/0126130 A1 | 5/2008 | Miller |
| 2008/0126131 A1 | 5/2008 | Lou |
| 2009/0167531 A1 | 7/2009 | Ferguson |
| 2009/0248450 A1 | 10/2009 | Fernandez |
| 2009/0254371 A1 | 10/2009 | Bartholomew, III |
| 2009/0254372 A1 | 10/2009 | Bartholomew, III |
| 2009/0265189 A1 | 10/2009 | Bartholomew, III |
| 2010/0089937 A1 | 4/2010 | Luciano |
| 2010/0185456 A1 | 7/2010 | Kansal |
| 2011/0000170 A1 | 1/2011 | Burg |
| 2011/0015947 A1 | 1/2011 | Erry |
| 2011/0071847 A1 | 3/2011 | Keresman, III |
| 2011/0112860 A1* | 5/2011 | Kehr ................................ 705/2 |
| 2011/0166877 A1 | 7/2011 | Bartholomew, III |
| 2011/0173025 A1 | 7/2011 | Bartholomew, III |
| 2011/0173026 A1 | 7/2011 | Bartholomew, III |
| 2011/0180448 A1 | 7/2011 | Taneja |
| 2011/0184758 A1 | 7/2011 | White |

OTHER PUBLICATIONS

Behrens, Kathleen. United States. Executive Office of the President. President's Council of Advisors on Science and Technology. 2008. Print. <http://www.whitehouse.gov/files/documents/ostp/PCAST/pcast_report_v2.pdf>.

Jencks, M.D., M.P.H., Stephen F., Mark V. Williams, M.D., and Eric A. Coleman, M.D., M.P.H. "Rehospitalizations Among Patients in the Medicare Fee-for-Service Program." New England Journal of Medicine.(2009) 360: 1418-1428. http://www.nejm.org/doi/pdf/10.1056/NEJMsa0803563.

Boutwell, A. Jencks, S. Nielsen, GA. Rutherford, P. STate Action on Avoidable Rehospitalizations (STAAR) Initiative: Applying early evidence and experience in front-line process improvements to develop a state-based strategy. Cambridge, MA: Institute for Healthcare Improvement; 2009. http://www.academyhealth.org/files/Balik_STAAR%20Initiative.pdf.

Hackbarth, Glenn M. United States. Medicare Payment Advisory Commission.Reforming America's Health Care Delivery System. Washington, DC: 2009. Web.<http://www.medpac.gov/documents/Hackbarth Statement SFC Roundtable 4 21 FINAL with header and footer.pdf>.

"Pharmacogenomics." Merriam-Webster.Merriam-Webster, n.d. Web.Oct. 25, 2011.<http://www.merriam-webster.com/dictionary/pharmacogenomic>. (last accessed, Oct. 25, 2011).

Tanzi, Maria, and Michael Posey. "Pharmacogenomics takes San Antonio by storm." Pharmacist.com Apr. 7, 2009. n. page. Web. Nov. 8, 2011. <http://www.pharmacist.com/AM/Template.cfm?Section=Pharmacy_News&template=/CM/ContentDisplay.cfm&ContentID=19293>.

www.fda.gov/Drugs/ScienceResearch/ResearchAreas/pharmacogenetics/ucm083378.htm (last accessed, Oct. 25, 2011).

http://www.ncbi.nlm.nih.gov/genome/guide/human (last accessed on Oct. 25, 2011).

McWilliam A, Letter R, Nardinelli C. Health care savings from personalized medicine using genetic testing: the case of warfarin. working paper 06-23 AEI-Brookings Joint Center for Regulatory Studies. Nov. 2006. http://regulation2point0.org/wp-content/uploads/downloads/2010/04/WP06-23_topost.pdf.

Stanek, Eric, and Christopher Sanders. "National Pharmacogenomics Physician Survey." Who are the Physicians Adopting Pharmacogenomics and How Does Knowledge Impact Adoption?. 2008. Print. <http://www.medcoresearchinstitute.com/docs/ASHG_Clinical-Brief.pdf>.

Teutsch, Steven, and Reed Tuckson. Ed. Realizing the Potential of Pharmacogenomics: Opportunities and Challenges. Bethesda, MD, 2008. 1-172. Print. <http://oba.od.nih.gov/oba/SACGHS/reports/SACGHS_PGx_report.pdf>.

United States. Medicare Payment Advisory Commission.Report to the Congress: Promoting Greater Efficiency in Medicare. Washintgon, DC: , 2007. Web.<http://www.medpac.govidocuments/Jun07_EntireReport.pdf>.

\* cited by examiner

MEDICATION MANAGEMENT SYSTEM AND METHOD

CROSS REFERENCE TO RELATED APPLICATION(S)

This application claims the benefit of U.S. Provisional Application No. 61/411,496, filed Nov. 9, 2010.

FIELD OF THE INVENTION

The present invention relates in general to medication management systems and more particularly to computer program-implemented interventions during a patient's care transition into an in-patient care facility, during the patient's stay at an in-patient care facility and discharge from the in-patient care facility.

BACKGROUND OF THE INVENTION

Adverse Drug Reactions

Those involved with medication therapy, especially for the elderly, are aware of the "medication system nightmare" that results from the complexity of medications, the number of physicians prescribing for the same patient, the trial and error nature of prescribing, and the palpable negative impact that this has on both quality of care and total costs. For instance, the number one reason for hospital recidivism is medication related (i.e., hospital readmissions of the elderly within 30 days of discharge, for the same problem they had on the first admission). There is no standard system to reconcile medications for these discharge patients. In the absence of a reconciliation, patients are often discharged with new medications from a hospital or skilled nursing facility and left to return home to find existing prescriptions in their home, often from unrelated specialists that may or may not be necessary or even safe to consume in light of the patient's new medical regimen.

One futile attempt at solving this problem has been to require home health agency nurses to perform the reconciliation task. Often, nurses profess that their medication knowledge is scant and they feel frustrated attempting to do this task. There are few community primary care physicians remaining, and even those who are in practice rarely can see a patient within a few days from hospital discharge to work through this medication reconciliation issue. Furthermore, the community primary care practitioners do not receive a timely report about the hospitalization, nor are they any longer involved with such care in many instances. Hospitalists, employed by the hospital, provide care and perform discharge summaries, but do not focus on medication reconciliation.

Over the past few years, data has emerged indicating that, nationwide, between 19.6% and 25% of Medicare patients discharged from U.S. hospitals are readmitted within 30 days for the same diagnosis, costing the government between $19 billion and (with some estimates as high as) $100 billion. Of these amounts, some 75% is deemed to be preventable. One large payer in Philadelphia has already stopped paying for readmissions for the same diagnosis within 14 days of discharge. Literature is replete with data indicating that a Nurse Practitioner home visit within days of discharge, in addition to pharmacist-led medication reconciliation, is cardinal to avoiding rehospitalizations.

While most hospitalizations are necessary and appropriate, in early 2009, the New England Journal of Medicine reported that nearly one in every five elderly patients who are discharged from the hospital are rehospitalized within 30 days. Jencks S F, Williams M V, Coleman E A. Rehospitalizations among patients in the Medicare fee-for service program. New England Journal of Medicine. 2009, 360(14):1418-1428.

In fact, 50% of patients who were rehospitalized within thirty days had no intervening primary care visit between discharge and rehospitalization. This area of high cost and low quality has been, and continues to be, a target of payment reform. Boutwell, A. Jencks, S. Nielsen, G A. Rutherford, P. State Action on Avoidable Rehospitalizations (STARR) Initiative: Applying early evidence and experience in front-line process improvements to develop a state-based strategy. Cambridge, Mass.: Institute for Healthcare Improvement; 2009.

In 2007, MedPac analysis estimated that as many as 17.6% of medicare rehospitalizations were avoidable through establishing a stable and safe transition of care from the hospital to the home. In addition, savings from preventing readmissions can be considerable. According to the Apr. 21, 2009, Medicare Payment Advisory Commission report to the Senate Finance Committee on Reforming America's Health Care Delivery System, 18% of Medicare hospital admissions resulted in readmissions with 30 days of discharge, accounting for $15 billion in spending and that Medicare spends about $12 billion on potentially preventable readmissions.

Aside from the problems with rehospitalization, over 2 million serious Adverse Drug Reactions (ADRs) are reported annually, accounting for 100,000 annual deaths in the United States. ADRs are the cause for 6% to 7% of all hospitalizations and an increase of an average of 2 days for the average length-of-stay in a hospital. ADRs are the fourth leading cause of death in the United States, amounting to more deaths than those resulting from pulmonary diseases, diabetes, AIDS, pneumonia, accidents and automobile deaths combined.

Senior citizens bear the brunt of the ADR problems because 40% of seniors take five or more medications per week. Up to 12% of seniors take ten or more medications per week. While the incidents of drug metabolizing interactions is 13% for two medications, it climbs to 82% for seven or more simultaneous medications. A system relying on in-house clinicians and pharmacists miss or ignore potential dangerous drug interactions up to half of the time. Furthermore, the new discipline of pharmacogenomics, discussed below, is rarely utilized, based on a lack of familiarity with this new discipline.

Pharmacogenomics

Pharmacogenomics is an emerging personalized medicine discipline. Pharmacogenomics is the science concerned with ways to compensate for genetic differences in patients which cause varied responses to a single drug. http:www.merriam-ebster.com/dictionary/pharmacogenomic (last accessed, Oct. 25, 2011). Pharmacogenomic data may be used by health care professionals to: (1) determine which patients will require specific treatments, (2) predict which patients will respond to therapy, (3) predict the right dose for the right patient, and (4) predict which patients will have an adverse reaction to selected therapies. Tanzi M G, Posey L M. Pharmacogenomics takes San Antonio by storm. Pharmacy Today. 2009; 15(6):27-30. For over a decade, pharmacogenomic-based technology and its integration into clinical practice have been the focus of scientists, industries and practitioners.

Pharmacogenomic-related information is contained in about ten percent of labels for drugs currently approved by the Food and Drug Administration ("FDA"). A significant increase of labels containing such information has been observed over the last decade.

www.fda.gov/Drugs/ScienceResearch/ResearchAreas/pharmacogenetics/ucm083378.htm (last accessed, Oct. 25, 2011). It is believed that there are approximately 225 genes that determine the integrity of more than 1,800 drug metabolizing enzymes.

Specific genetic variations are associated with more than 1,500 health conditions, including Alzheimer's disease, inherited breast and ovarian cancer, cystic fibrosis, hemophilia, Huntington's disease and myotonic dystrophy. These genetic risk assessments however do not guarantee that individuals will or will not develop a condition. Pharmacogenomics, on the other hand, is much more refined—enabling high probability predictions on whether a medication will work for a particular patient, and how much of it will be effective.

In order to perform a pharmacogenomics DNA test, cell samples are obtained with a cheek swab. It is not necessary to sequence an individual's entire genome in order to examine specific pharmacogenomic genotypes. Pharmacogenomic diagnostic tests identify select genetic variations, also referred to as single nucleotide polymorphisms (SNPs), within the human genome. See, http://www.ncbi.nlm.nih.gov/genome/guide/human (last accessed on Oct. 25, 2011). A central repository for single base nucleotide substitutions and short deletion and insertion polymorphisms is supported by the National Center for Biotechnology Information (NCBI) and the National Human Genome Research Institute (NHGRI). Tanzi M G, Posey L M. Pharmacogenomics takes San Antonio by storm. Pharmacy Today. 2009; 15(6):27-30.

Pharmacogenomics forms the platform for the practice of personalized medicine. Personalized medicine is the use of a person's clinical, genetic, genomic and environmental information to select a medication, its dose, choose a therapy or recommend preventative health measures. The goal of personalized medicine is to optimize health care and medical outcomes by utilizing a preventative, coordinated and evidence-based approach. Personalized medicine does not refer to the creation of drugs designed for an individual, but rather for the subpopulations of patients that differ in their susceptibility to a particular disease or their response to a specific treatment. President's Council of Advisors on Science and Technology. Priorities for Personalized Medicine. 2008.

The promise of personalized medicine, for which evidence already exists, includes the ability to: (i) shift emphasis in medicine from reaction to prevention; (ii) enable the selection of optimal therapy and reduce trial and error prescribing; (iii) make the use of drugs safer by avoiding adverse drug reactions; (iv) increase patient compliance with treatment due to fewer side effects; (v) reduce the time and cost of clinical trials; (vi) revive drugs that are failing in clinical trials or were withdrawn from the market; and (vii) reduce the overall cost of healthcare.

In a 2006 study, it was estimated that proper genetic testing and dosing of warfarin may have prevented 17,000 strokes, 85,000 serious bleeding events and 43,000 visits to the emergency department. Subtracting the price of two million genetic tests costing between $125 and $500 per patient, an overall savings to the helath care system would have been approximately $1.1 billion. McWilliam A., Lutter R., Nardinelli C., Health Care Savings from Personalized Medicine Using Genetic Testing: the case of warfarin. AEI-Brookings Joint Center. 2006. Available at, http://aei-brookings.org/admin/authorpdfs/redirect-safety.php?fname=./pdffiles/WP06-23 topost.pdf.

Current practicing prescribers understand the immense value of pharmacogenomics, but have not been trained in translating it into application. An October 2008 study by MEDCO, with responses from 10,303 prescribing physicians, indicated that while 98% of physicians agree that patient genetic profiles will influence prescribing, less than 10% believe they are adequately informed (educated) about applying pharmacogenomics. See, https://www.medcoresearch.com/community/pharmacogenomics/physicia nsurvey. (last accessed, Jan. 10, 2010).

A report by the National Institute of Health's ("NIH") Secretary's Advisory Committee on Genetics, Health, and Society (SACGHS) recognizes the current challenges of integrating pharmacogenomics into clinical practice as: (i) product development and clinical studies must be adapted to assess the accuracy and predictive value of pharmacogenomic-based diagnostics; (ii) clinical trials must be adapted to determine the safety, efficacy, and effectiveness of pharmacogenomic-based therapies; (iii) regulation of pharmacogenomic-related products that foster innovation while ensuring patient safety and improved outcomes; (iv) coverage and reimbursement of pharmacogenomic technologies may be insufficient to support the development and manufacturing costs of these therapies and tests; (v) health information technology infrastructure must be sufficiently robust, detailed and interoperable to support research, treatment decisions and surveillance; (vi) education and training for physicians and other clinicians are essential to ensure that their competence with pharmacogenomic technologies and their ability to counsel patients and families to make informed health care decisions; and (vii) ethical, legal and societal issues will continue to arise as advances in pharmacogenomics result in greater compilation, transmission and use of genetic information. Realizing the potential of Pharmacogenomics: Opportunities and Challenges. Secretary's Advisory Committee on Genetics, Health, and Society. May 2008. Available at, http://oba.od.nih.gov/oba/SACGHS/reports/SACGHS PGx report.pdf (last accessed, Oct. 25, 2011).

Others have attempted to solve related problems in the art. For example, U.S. Patent Pub. No. 20110000170 describes a process where prescriptions are sent to a database to produce a regimen care schedule that results in a medicine pack being created pursuant to the schedule. Each medical card has a week's worth of medicine to be administered at various times of day. The program also determines if prescriptions would create interactions based on, for example, patient allergies.

U.S. Patent Pub. No. 20070173971 utilizes a database to collect information from a pharmacy or a patient and ultimately dispenses the medication in pouches.

U.S. Patent Pub. No. 20110166877 discloses quality control methods for a medication therapy management system. The application discloses a process for developing clinical rules by seeking consensus among practitioners and then translating those rules into computer code that triggers PharmD intervention.

U.S. Patent Pub. No. 20090265189 discloses a system that receives input from pharmacy claims, lab data, medication risk assessment data and other sources. After rules are established, the existing data is screened to identify any medication risks. Patient-specific follow-up is then suggested.

U.S. Patent Pub. No. 20090254371 discloses the development of clinical rules based on national standards and a peer review process U.S. Patent Pub. No. 20080126131 discloses medication therapy management. The problem of drug-drug, drug-disease, drug-age and patient-genetic interactions ([0004] and [0030]) are discussed. Similar matter is addressed in U.S. Patent Pub. No. 20080126117.

Despite these advances, there still exists a need in the art for a centralized system that would permit health care providers, pharmacists, patients and patient caregivers to have coordinated access to all of the same information to prevent miscommunication or misunderstanding, particularly during transitions from health care facilities to the home. A further need exists in the art for the centralized system to validate that a patient's entire drug regimen is safe and effective in light of potential adverse health consequences for drug interactions and potential adverse health consequences based on a particular drug in light of a patient's personal gene interactions with the drug or a patient's clinical laboratory results.

SUMMARY OF THE INVENTION

According to the present invention, the foregoing and other objects and advantages are obtained by utilizing a method for providing intervention during a patient's care transition. The method involves: registering a patient in a cloud-based medication management system upon the patient's arrival at a skilled nursing facility; inputting data corresponding to one or more of a patient's existing medications and the patient's clinical data into the cloud-based medication management system; utilizing pre-existing rules in a cloud-based medication management system to compare the patient's existing medications to the patient's clinical data to determine whether an adverse health outcome would result from the combination of the patient's use of existing medications in light of the patient's clinical data; utilizing pre-existing rules in a cloud-based medication management system to compare each of the patient's existing medications to each of the patient's other existing medications to determine whether an adverse health outcome would result from the combination of the patient's use of existing medications in combination with each other existing medication; obtaining information from the patient's non-medical caretakers with respect to any additional medication the patient may have at home; inputting data corresponding to one or more of a patient's home medications into the cloud-based medication management system; utilizing pre-existing rules in a cloud-based medication management system to compare the patient's home medications to the patient's clinical data to determine whether an adverse health outcome would result from the combination of the patient's use of home medications in light of the patient's clinical data; utilizing pre-existing rules in a cloud-based medication management system to compare each of the patient's home medications to each of the patient's other home medications and existing medications to determine whether an adverse health outcome would result from the combination of the patient's use of home medications in combination with each other home medication and existing medication; modifying data corresponding to a patient's existing and home medications to reflect any necessary changes to the patient's medication regimen made by a health care provider prior to the patient's discharge from a skilled nursing facility in order to produce a final medication regimen; utilizing pre-existing rules in a cloud-based medication management system to compare the patient's final medication regimen to the patient's clinical data to determine whether an adverse health outcome would result from the combination of the patient's use of the final medication regimen in light of the patient's clinical data; utilizing pre-existing rules in a cloud-based medications management system to compare each of the patient's medications in the patient's final medication regimen to each of the patient's other medications in the patient's final medication regimen to determine whether an adverse health outcome would result from the combination of the patient's use of medications in the final medication regimen in combination with each other medication in the patient's final medication regimen; Providing notification by a PharmD to a health care provider in the event that the pre-existing rules in the cloud-based medication management system indicate the likelihood of an adverse health outcome would result; modifying data corresponding to a patient's existing medications, home medications or final medication regimen to reflect any necessary changes to the patient's medication regimen made by a health care provider upon medication changes made by the health care provider as a result of an identified likelihood of an adverse health outcome; utilizing pre-existing rules in a cloud-based medication management system to compare the patient's modified medication regimen to the patient's clinical data to determine whether an adverse health outcome would result from the combination of the patient's use of the modified medication regimen in light of the patient's clinical data; utilizing pre-existing rules in a cloud-based medication management system to compare each of the patient's medications in the patient's modified medication regimen to each of the patient's other medications in the patient's modified medication regimen to determine whether an adverse health outcome would result from the combination of the patient's use of medications in the modified medication regimen in combination with each other medication in the patient's modified medication regimen; assembling a patient's final medication regimen by robotic automation into one or more packages; and providing access to the cloud-based medication management system to the patient and other individuals authorized by the patient in order to permit the patient and other patient authorized individuals to review the patient's current medication regimen with any subsequent alterations.

In accordance with an aspect of the invention, a patient's clinical data can include pharmacogenomic data, as well as medical test results, for example. Non-medical caretakers can include family members or non-family caretakers. Non-family caretakers can include any non-professional healthcare provider familiar with the patient's home medication including, without limitation, a patient's acquaintances or volunteers.

In accordance with another aspect of the invention, modifying data corresponding to a patient's existing and home medications to reflect any necessary changes to the patient's medication regimen can be made by a health care provider within less than about two days prior to the patient's discharge from a skilled nursing facility in order to produce a final medication regimen.

In accordance with another aspect of the invention, the medication packages can comprise multi-dose, deep blister, adherence cards wherein each adherence card holds all of a patient's drugs scheduled to be taken at a particular dosage time in an individual well, whereby there are one or more dosage times per day and all of the dosages for a seven-day period are contained on a single adherence card.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
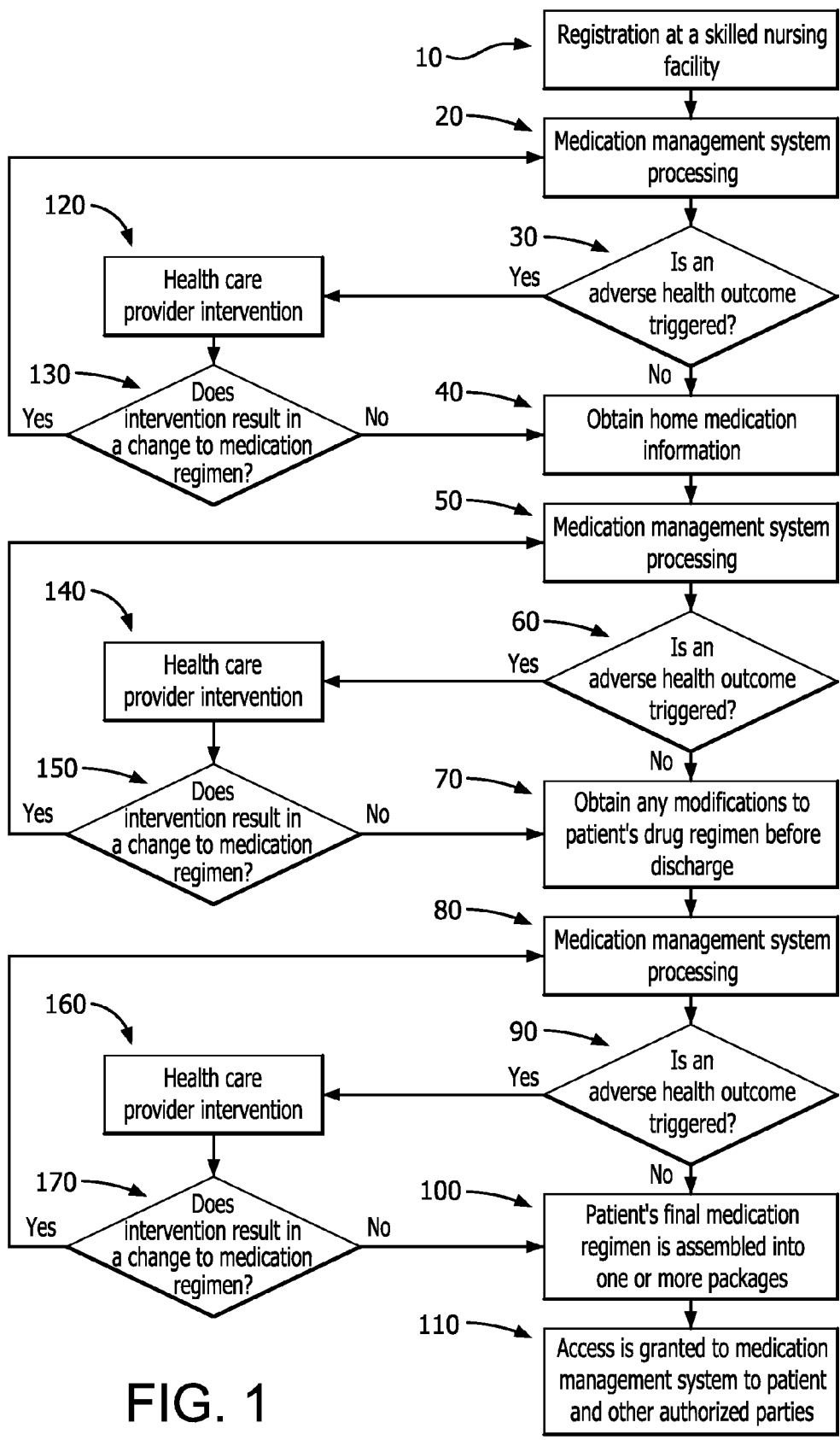
FIG. 1 is a diagram describing a system for carrying out one embodiment of the invention.

The following text sets forth a detailed description of numerous different embodiments, but it should be understood that the legal scope of the description is defined by the words of the claims set forth herein. The detailed description is to be construed only as an exemplary disclosure that contains the best mode of making and using the invention, but not every possible embodiment of the invention is disclosed since each combination would be impossible to describe. Numerous alternative embodiments could be implemented, using either current technology or technology developed after the filing date of this patent, which would still fall within the scope of the claims.

In one embodiment of the present invention, the invention makes use of a computerized system to utilize the internet infrastructure and the http protocol communication stack to enable care providers or other authorized users to have access their patients' information anywhere an internet connection can be established on any WC3 compliant browser. This includes any desktop, laptop, tablet pc and any browser enabled smart phone, for example. This computerized system has the capability for the care provider to checkout a patient's chart so that the care provider can manage patient information when not connected to the internet. Subsequently, when the care provider is connected to the internet, the care provider can upload the information to a cloud-based, remote computer server infrastructure on a secure basis. In so doing, this computerized system can be used without file or application management by the care provider or any other user, such as a pharmacist, a hospital, a clinic, a pharmacy, a health care insurance company, a patient or third parties authorized by the patient.

In other embodiments, the computerized system may establish a network using a wide variety of other techniques well known to those skilled in the art for the transfer of electronic data. For example, the computerized system may utilize a plurality of network computers or server computers, each of which may be operatively interconnected in a known manner. In other embodiments, the computerized system may permit real-time data uploads that are instantaneously viewable by all of the computerized system's users. It should be further understood that in some embodiments, databases containing data and the processing rules herein described may be coupled to a data network by a network computer which may include a processor, a memory operatively coupled to the processor and/or a database operatively coupled to the processor and memory.

In a preferred embodiment, the computerized system is used to facilitate intervention during a patient's care transition into a skilled nursing facility and during their subsequent discharge from the skilled nursing facility. The computerized system is further adapted in such an embodiment to produce medication packages that can comprise, in a preferred embodiment, multi-dose, deep blister, adherence cards wherein each adherence card holds all of a patient's drugs scheduled to be taken at a particular dosage time in an individual well, whereby there are one or more dosage times per day and all of the dosages for a seven-day period are contained on a single adherence card.

Referring to the drawings wherein like or similar references indicate like or similar elements throughout the several views, there is shown in FIG. 1 a diagram describing a system for carrying out one embodiment of the invention. FIG. 1 depicts step 10 where a patient is initially registered upon admission to a skilled nursing facility, or similar in-patient medical treatment facility, such as a hospital, nursing home or any other facility commonly recognized as such by those having ordinary skill in the art. While not depicted, a patient may arrive at an in-patient medical facility upon discharge from a hospital, for example. During registration at step 10, the patient is registered in a cloud-based medication management system. The medication management system utilizes a database operatively coupled with a processor and memory in a manner known to those having ordinary skill in the art that permits the cloud-based medication management system to be utilized without application software running on a personal computer. The term "cloud" is used by those having skill in the art to reference a computer system where stored data resides on a remotely accessible server, rather than within the internal memory of a particular user device. Instead, the cloud-based medication management system is located on remote servers, whereby a computer user is able to access and utilize the cloud-based medication management system via the internet, for example.

The medication management system's database is populated with data corresponding to the patient's identity, home address, physicians, insurance providers, and the existing medications the patient, patient's health care providers or any other knowledgeable party supplies during step 10. Any available data corresponding to the patient's clinical test results or the patient's genomic information can also be input into the medication management system's database at step 10 in the process. It is understood that the medication management system's database can be modified as new information becomes known or as modifications are made to existing data. Such modifications can happen at any time, in addition to the times referenced in the embodiment referenced by FIG. 1.

During step 20, the medication management system processes the information supplied during step 10 and determines whether an adverse health outcome is triggered pursuant to rules programmed into the medication management system. The rules compare the patient's drugs to the patient's other drugs, clinical test results and genomic information to determine whether the combination of any drug in light of any other drug, clinical test or genomic indicator would trigger an adverse health outcome. Adverse health outcomes based on pharmacogenomic incompatibilities are also processed by the pre-programmed rules. The rules are programmed into the system based on readily available information from sources recognized as authoritative by those having ordinary skill in the art.

If an adverse health outcome is triggered at step 30, the medication management system will alert the system's user to seek health care provider intervention at step 120. The system's user may include, for example, a PharmD, a nurse, a physician or another authorized party. If the health care provider's intervention results in a change to the medication regimen at step 130, the medication management system will be updated to reflect the modified medication regimen and proceed back to step 20. Otherwise, the system will proceed to step 40. At step 40, the system's users will contact a patient's family members or any other non-medical caretakers who have knowledge of the patient's home care to determine whether the patient has any additional medications presently located in their home which were not previously input into the medication management system at step 10. A non-medical caretaker could include, for example, friends, neighbors, and volunteers.

At step 50, the medication management system processes any new information added during step 40, along with the pre-existing data input during, for example, step 10. In a manner similar to step 20, the medication management system applies the pre-programmed rules to determine whether an adverse health outcome is triggered at step 60. If an adverse health outcome is triggered at step 60, the medication management system will alert the system's user to seek health care provider intervention at step 140. If a health care provider's intervention results in a change to the medication regimen at step 150, then the medication management system will be updated to reflect the modified medication regimen and proceed back to step 50. Otherwise, the system will proceed to step 70. At step 70, the medication management system's user will obtain information related to any modifications that may have been made by a health care provider to a patient's drug regimen before discharge. In a preferred embodiment, the information at step 70 is obtained between about one and about two days prior to discharge from the in-patient health care facility.

At step 80, the medication management system processes any new information added during step 70, along with the pre-existing data input during, for example, steps 10 and 40. In a manner similar to steps 20 and 50, the medication management system applies the pre-programmed rules to determine whether an adverse health outcome is triggered at step 90. If an adverse health outcome is triggered at step 90, the medication management system will alert the system's user to seek health care provider intervention at step 160. If a health care provider's intervention results in a change to the medication regimen at step 170, then the medication management system will be updated to reflect the modified medication regimen and proceed back to step 80. Otherwise, the system will proceed to step 100.

Accordingly, steps 120, 140 and 160 amount to three points of health care provider intervention which are designed to mitigate the risk of adverse drug reactions and other adverse health outcomes during a patient's care transition both into an in-patient medical facility, and subsequently through the patient's discharge from the in-patient medical facility.

Figure 2:
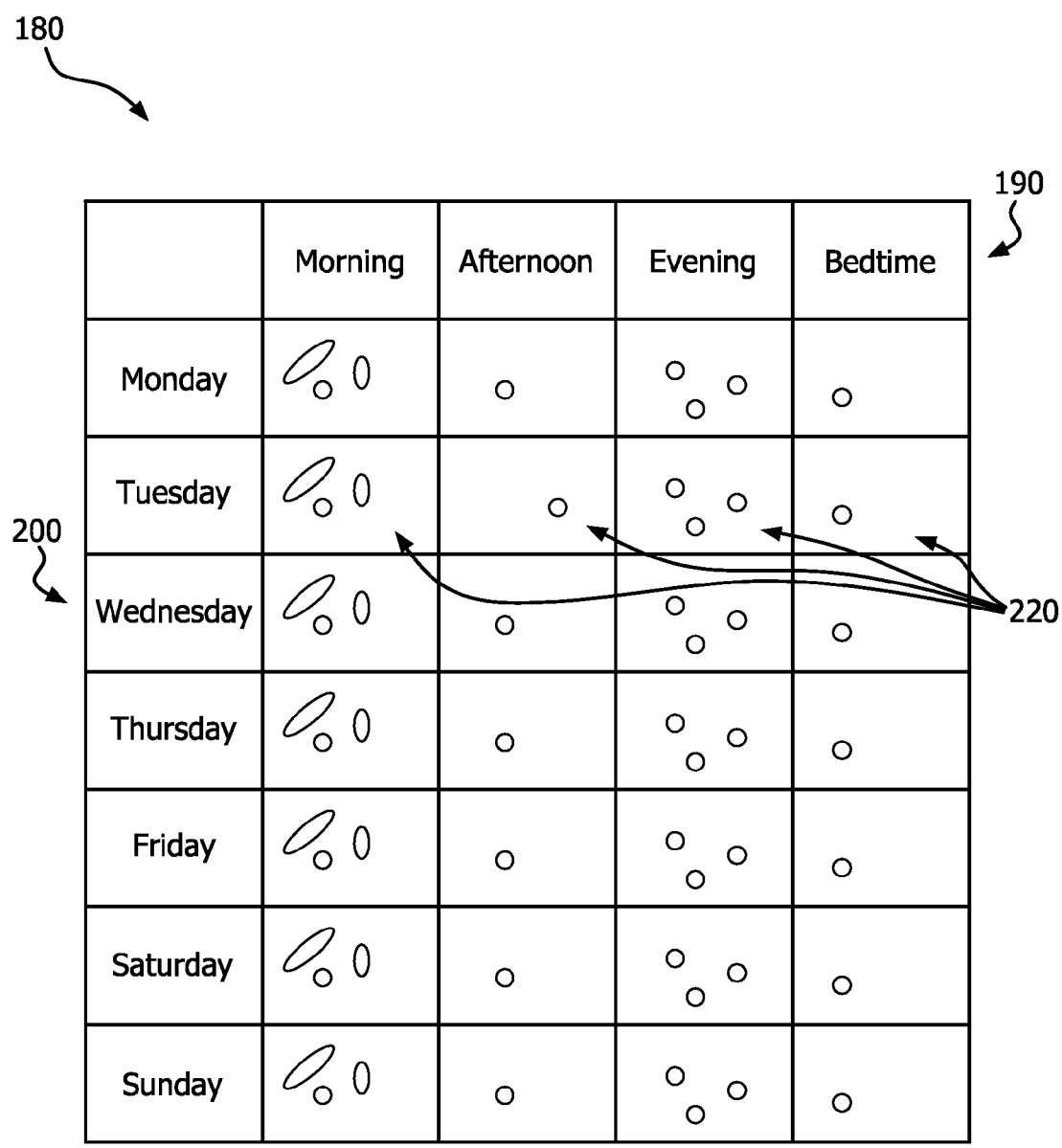
FIG. 2 is a perspective view showing a multi-dosage, deep-well adherence package card according to one embodiment of the invention.

At step 100, a patient's final medication regimen is assembled into packages by robotic automation using equipment designed for this purpose known to those ordinarily skilled in the art. In a preferred embodiment, the packages take the form of the multi-dose, deep blister, adherence packaging depicted in FIG. 2, generally referenced by reference numeral 180. The adherence packaging 180 contains a row for dosage times 190. Dosage times 190 may include, for example, morning, afternoon, evening and bedtime. In other embodiments, dosage times 190 may be depicted on a column. Dosage days 200 are depicted on a column on adherence packaging 180. The dosage days correspond to each day of a single week. In other embodiments, dosage days 190 may be depicted on a row. For example, one or more medications may be included in a deep well corresponding to a particular combination of dosage day 200 and dosage time 190. For example, there are three pills shown in deep-well 210 corresponding to the sum of medications a given patient may take on a Monday morning. As a further example, the sum of pills a patient would take during the entire day on a Tuesday are shown in the three deep-wells shown by reference numeral 220.

Referring back to FIG. 1, access is granted to the medication management system to a patient and any other patient-authorized parties at step 110. During this step, a patient or any other patient-authorized parties, such as family members, other health care practitioners, volunteers or neighbors, can remotely access the medication management system from any computer operatively configured to access and use the internet through, for example, a web browser. Access 110 permits the patient and other patient-authorized users to view the patient's medication regimen, with any subsequent alterations, view longitudinal track and trending, and view any comments that may be included by any of the system's users.

The invention claimed is:

1. A method for providing intervention during a patient's care transition, comprising:

registering a patient in a cloud-based medication management system upon the patient's arrival at a skilled nursing facility;

inputting data corresponding to one or more of a patient's existing medications and the patient's clinical data into the cloud-based medication management system;

utilizing, via a computer processor, pre-existing rules in a cloud-based medication management system to compare the patient's existing medications to the patient's clinical data to determine whether an adverse health outcome would result from the combination of the patient's use of existing medications in light of the patient's clinical data;

utilizing, via a computer processor, pre-existing rules in a cloud-based medication management system to compare each of the patient's existing medications to each of the patient's other existing medications to determine whether an adverse health outcome would result from the combination of the patient's use of existing medications in combination with each other existing medication;

obtaining information from the patient's non-medical caretakers with respect to any additional medication the patient may have at home;

inputting data corresponding to one or more of a patient's home medications into the cloud-based medication management system;

utilizing pre-existing rules in a cloud-based medication management system to compare the patient's home medications to the patient's clinical data to determine whether an adverse health outcome would result from the combination of the patient's use of home medications in light of the patient's clinical data;

utilizing pre-existing rules in a cloud-based medication management system to compare each of the patient's home medications to each of the patient's other home medications and existing medications to determine whether an adverse health outcome would result from the combination of the patient's use of home medications in combination with each other home medication and existing medication;

modifying data corresponding to a patient's existing and home medications to reflect any necessary changes to the patient's medication regimen made by a health care provider prior to the patient's discharge from a skilled nursing facility in order to produce a final medication regimen;

utilizing pre-existing rules in a cloud-based medication management system to compare the patient's final medication regimen to the patient's clinical data to determine whether an adverse health outcome would result from the combination of the patient's use of the final medication regimen in light of the patient's clinical data;

utilizing pre-existing rules in a cloud-based medications management system to compare each of the patient's medications in the patient's final medication regimen to each of the patient's other medications in the patient's final medication regimen to determine whether an adverse health outcome would result from the combination of the patient's use of medications in the final medication regimen in combination with each other medication in the patient's final medication regimen;

notifying a health care provider by a person with a professional doctorate degree in pharmacy in the event that the pre-existing rules in the cloud-based medication management system indicate the likelihood of an adverse health outcome would result;

modifying data corresponding to a patient's existing medications, home medications or final medication regimen to reflect any necessary changes to the patient's medication regimen made by a health care provider upon medication changes made by the health care provider as a result of an identified likelihood of an adverse health outcome;

utilizing pre-existing rules in a cloud-based medication management system to compare the patient's modified medication regimen to the patient's clinical data to determine whether an adverse health outcome would result from the combination of the patient's use of the modified medication regimen in light of the patient's clinical data;

utilizing pre-existing rules in a cloud-based medication management system to compare each of the patient's medications in the patient's modified medication regimen to each of the patient's other medications in the patient's modified medication regimen to determine whether an adverse health outcome would result from the combination of the patient's use of medications in the modified medication regimen in combination with each other medication in the patient's modified medication regimen;

assembling a patient's final medication regimen by robotic automation into one or more packages; and providing access to the cloud-based medication management system to the patient and other individuals authorized by the patient in order to permit the patient and other patient authorized individuals to review the patient's current medication regimen with any subsequent alterations.

2. The method of claim 1 wherein the patient's clinical data further comprises pharmacogenomic data.

3. The method of claim 1 wherein the patient's clinical data further comprises data related to medical test results.

4. The method of claim 1 wherein the non-medical caretakers comprise at least one of family members or non-family caretakers.

5. The method of claim 4 wherein non-family caretakers comprise any non-professional healthcare provider familiar with the patient's home medications including, without limitation, a patient's acquaintances or volunteers.

6. The method of claim 1 wherein modifying data corresponding to a patient's existing and home medications to reflect any necessary changes to the patient's medication regimen is made by a health care provider within less than two days prior to the patient's discharge from a skilled nursing facility in order to produce a final medication regimen.

7. The method of claim 1 wherein the packages comprise multi-dose, deep blister, adherence cards wherein each adherence card holds all of a patient's drugs scheduled to be taken at a particular dosage time in an individual well, whereby there are at least one dosage times per day and all of the dosages for a one-week period are contained on a single adherence card.

* * * * *